(12) United States Patent
Kesler et al.

(10) Patent No.: US 7,868,776 B2
(45) Date of Patent: Jan. 11, 2011

(54) APPARATUS AND SYSTEM FOR ADJUSTING SETTINGS OF A POWER SYSTEM DEVICE USING A MAGNETICALLY COUPLED ACTUATOR

(75) Inventors: James R. Kesler, Pullman, WA (US); Luther S. Anderson, Pullman, WA (US); Steven A. McMahon, Clarkston, WA (US); Witold R. Teller, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 425 days.

(21) Appl. No.: 11/750,904

(22) Filed: May 18, 2007

(65) Prior Publication Data

US 2007/0270114 A1 Nov. 22, 2007

Related U.S. Application Data

(60) Provisional application No. 60/802,075, filed on May 19, 2006.

(51) Int. Cl.
*G08B 21/00* (2006.01)
(52) U.S. Cl. .......................... 340/635; 340/643; 324/529
(58) Field of Classification Search ................. 340/529, 340/635, 643, 538; 324/529
See application file for complete search history.

(56) References Cited

U.S. PATENT DOCUMENTS

| | | | |
|---|---|---|---|
| 2,379,664 A | 7/1945 | Stanko | |
| 2,928,048 A | 3/1960 | Postal | |
| 2,967,267 A | 1/1961 | Steinman | |
| 3,292,579 A | 12/1966 | Buchanan | |
| 3,296,493 A | 1/1967 | Whittaker | |
| 3,476,997 A | 11/1969 | Otzipka | |
| 3,525,903 A | 8/1970 | Morris | |
| 3,621,334 A | 11/1971 | Burns | |
| 3,676,740 A | 7/1972 | Schweitzer | |
| 3,702,966 A | 11/1972 | Schweitzer | |
| 3,708,724 A | 1/1973 | Schweitzer | |
| 3,715,742 A | 2/1973 | Schweitzer | |
| 3,781,682 A | 12/1973 | Schweitzer | |
| 3,816,816 A | 6/1974 | Schweitzer | |
| 3,866,197 A | 2/1975 | Schweitzer | |

(Continued)

OTHER PUBLICATIONS

Fisher Priece Division of Pacific Scientific—Faulted Circuit Indicators—Technical Applications Data 1995; Anh Le, Dave Donovan, Bill Doherty.

(Continued)

*Primary Examiner*—George A Bugg
*Assistant Examiner*—Hongmin Fan
(74) *Attorney, Agent, or Firm*—Eugene M. Cummings, P.C.

(57) ABSTRACT

A system is provided for adjusting settings of a power system device. In one embodiment, the setting adjusted is an identification setting of the power system device. The system generally includes an actuator having a select arrangement of magnets. A magnetic field sensor is provided for sensing the select arrangement of magnets. A microprocessor is coupled to the magnetic field sensor such that upon sensing the select arrangement of magnets by the magnetic field sensor, the microprocessor establishes an identification setting based upon the select arrangement. The various embodiments of the present invention provide an apparatus and system for adjusting settings of power system devices in harsh conditions, such as persistent in water.

26 Claims, 8 Drawing Sheets

U.S. PATENT DOCUMENTS

| | | |
|---|---|---|
| 3,876,911 A | 4/1975 | Schweitzer |
| 3,906,477 A | 9/1975 | Schweitzer |
| 3,972,581 A | 8/1976 | Oldham |
| 3,974,446 A | 8/1976 | Schweitzer |
| 4,029,951 A | 6/1977 | Berry |
| 4,034,360 A | 7/1977 | Schweitzer |
| 4,038,625 A | 7/1977 | Tompkins |
| 4,045,726 A | 8/1977 | Schweitzer |
| 4,063,171 A | 12/1977 | Schweitzer |
| 4,086,529 A | 4/1978 | Schweitzer |
| 4,112,292 A | 9/1978 | Varvel |
| 4,144,485 A | 3/1979 | Akita |
| 4,165,528 A | 8/1979 | Schweitzer |
| 4,186,986 A | 2/1980 | Shoemaker |
| 4,199,741 A | 4/1980 | Serrus Paulet |
| 4,234,847 A | 11/1980 | Schweitzer |
| 4,251,770 A | 2/1981 | Schweitzer |
| 4,288,743 A | 9/1981 | Schweitzer |
| 4,375,617 A | 3/1983 | Schweitzer |
| 4,414,543 A | 11/1983 | Schweitzer |
| 4,424,512 A | 1/1984 | Schweitzer |
| 4,438,403 A | 3/1984 | Schweitzer |
| 4,458,198 A | 7/1984 | Schweitzer |
| 4,495,489 A | 1/1985 | Schweitzer |
| 4,536,758 A | 8/1985 | Schweitzer |
| 4,686,518 A | 8/1987 | Schweitzer |
| 4,689,752 A | 8/1987 | Fernandes |
| 4,709,339 A | 11/1987 | Fernandes |
| 4,794,332 A | 12/1988 | Schweitzer |
| 4,795,982 A | 1/1989 | Schweitzer |
| 4,829,298 A | 5/1989 | Fernandes |
| 4,940,976 A | 7/1990 | Gastouniotis |
| 4,996,624 A | 2/1991 | Schweitzer |
| 5,008,651 A | 4/1991 | Schweitzer |
| 5,038,246 A | 8/1991 | Durivage |
| 5,070,301 A | 12/1991 | Schweitzer |
| 5,089,928 A | 2/1992 | Durivage |
| 5,136,457 A | 8/1992 | Durivage |
| 5,136,458 A | 8/1992 | Durivage |
| 5,150,361 A | 9/1992 | Wieczorek |
| 5,153,565 A | 10/1992 | Schweitzer |
| 5,168,414 A | 12/1992 | Horstmann |
| 5,196,682 A | 3/1993 | Englehardt |
| 5,220,311 A | 6/1993 | Schweitzer |
| 5,298,894 A | 3/1994 | Cerney |
| 5,420,502 A | 5/1995 | Schweitzer |
| 5,438,329 A | 8/1995 | Gastouniotis |
| 5,495,239 A | 2/1996 | Ouellette |
| 5,519,527 A | 5/1996 | Panton |
| 5,550,476 A | 8/1996 | Lau |
| 5,565,783 A | 10/1996 | Lau |
| 5,648,726 A | 7/1997 | Le |
| 5,656,931 A | 8/1997 | Lau et al. |
| 5,659,300 A | 8/1997 | Dresselhuys |
| 5,677,623 A | 10/1997 | Schweitzer |
| 5,677,678 A | 10/1997 | Schweitzer |
| 5,701,121 A | 12/1997 | Murdoch |
| 5,793,214 A | 8/1998 | Wakamatsu |
| 5,821,869 A | 10/1998 | Schweitzer |
| 5,825,303 A | 10/1998 | Bloss |
| 5,877,703 A | 3/1999 | Bloss, Jr. et al. |
| 5,889,399 A | 3/1999 | Schweitzer |
| 6,002,260 A | 12/1999 | Lau |
| 6,014,301 A | 1/2000 | Schweitzer |
| 6,016,105 A | 1/2000 | Schweitzer |
| 6,029,061 A | 2/2000 | Kohlschmidt |
| 6,072,405 A | 6/2000 | Sears |
| 6,078,785 A | 6/2000 | Bush |
| 6,133,724 A | 10/2000 | Schweitzer |
| 6,177,883 B1 | 1/2001 | Jannetti |
| 6,188,216 B1 | 2/2001 | Fromer |
| 6,239,722 B1 | 5/2001 | Colton |
| 6,326,905 B1 | 12/2001 | Walters |
| 6,349,248 B1 | 2/2002 | Dean |
| 6,366,217 B1 | 4/2002 | Cunningham |
| 6,380,733 B1 | 4/2002 | Apel |
| 6,414,605 B1 | 7/2002 | Walden |
| 6,429,661 B1 | 8/2002 | Schweitzer |
| 6,433,698 B1 | 8/2002 | Schweitzer |
| 6,479,981 B2 | 11/2002 | Schweitzer |
| 6,525,504 B1 | 2/2003 | Nygren |
| 6,573,707 B2 | 6/2003 | Kiriyama |
| 6,577,608 B1 | 6/2003 | Moon |
| 6,617,976 B2 | 9/2003 | Walden |
| 6,671,824 B1 | 12/2003 | Hyland |
| 6,736,646 B2 | 5/2004 | Takahashi |
| 6,753,792 B2 | 6/2004 | Beckwth |
| 6,759,933 B2 | 7/2004 | Fallak |
| 6,796,821 B2 | 9/2004 | Cairns |
| 6,798,211 B1 | 9/2004 | Rockwell |
| 6,828,906 B2 | 12/2004 | Malcolm |
| 6,944,555 B2 | 9/2005 | Blackett |
| 7,187,275 B2 * | 3/2007 | McCollough, Jr. .......... 340/538 |
| 7,391,299 B2 | 6/2008 | Bender |
| 2002/0089802 A1 | 7/2002 | Beckwth |
| 2003/0040897 A1 | 2/2003 | Murphy |
| 2003/0106782 A1* | 6/2003 | Galli .......................... 200/6 A |
| 2003/0119568 A1 | 6/2003 | Menard |
| 2003/0153368 A1 | 8/2003 | Bussan |
| 2003/0174067 A1 | 9/2003 | Soliman |
| 2003/0178290 A1 | 9/2003 | Schilling |
| 2003/0179149 A1 | 9/2003 | Savage |
| 2004/0005809 A1 | 1/2004 | Suzuki |
| 2004/0032340 A1 | 2/2004 | Lingafeldt |
| 2004/0036478 A1 | 2/2004 | Logvinov |
| 2004/0067366 A1 | 4/2004 | Gorczyca |
| 2004/0113810 A1 | 6/2004 | Mason |
| 2004/0214616 A1 | 10/2004 | Malcolm |
| 2004/0233159 A1 | 11/2004 | Badarneh |
| 2005/0040809 A1 | 2/2005 | Uber |
| 2005/0068193 A1 | 3/2005 | Osterloh |
| 2005/0068194 A1 | 3/2005 | Schleich |
| 2005/0079818 A1 | 4/2005 | Atwater |
| 2005/0087599 A1 | 4/2005 | Ward |
| 2005/0110656 A1 | 5/2005 | Patterson |
| 2005/0132115 A1 | 6/2005 | Leach |
| 2005/0151659 A1 | 7/2005 | Donovon |
| 2005/0205395 A1 | 9/2005 | Dietrich |
| 2005/0215280 A1 | 9/2005 | Twitchell, Jr |
| 2006/0084419 A1 | 4/2006 | Rocamora |
| 2007/0179547 A1 | 8/2007 | Armstrong |

OTHER PUBLICATIONS

Power Mangement Using the Embedded Stand-Alone Wake-Up Protocol. Rev. 2 (Aug. 2002); ATMEL AT86RF211.

Fisher Pierce—Radio Faulted Circuit Indicator System—(1999)—Joslyn Hi-Voltage http://www.joslynhivoltage.com/PDFFiles/RFCI.pdf.

Radio Faulted Circuit Indicator System by Joslyn Hi-Voltage, www.joslynhivoltage.com, Fisher Pierce 1999.

Radio Receivers Series 1560 Handheld or RTU/SCADA—Joslyn Hi-Voltage—Email: info@joslynhv.com ; http://www.joslynhivoltage.com/cat1560.htm and http://www.joslynhivoltage.com/spec1560.htm, Copyright 2001.

V Series—Lemo.

* cited by examiner

APPARATUS AND SYSTEM FOR ADJUSTING SETTINGS OF A POWER SYSTEM DEVICE USING A MAGNETICALLY COUPLED ACTUATOR

CROSS-REFERENCE TO RELATED APPLICATIONS

This application claims benefit under 35 U.S.C. §119(e) of U.S. Provisional Application entitled "APPARATUS AND SYSTEM FOR ADJUSTING SETTINGS OF A POWER SYSTEM DEVICE USING A MAGNETICALLY COUPLED ACTUATOR," filed on May 19, 2006, having Ser. No. 60/802,075, naming James R. Kesler as inventors, the complete disclosure thereof being incorporated by reference.

FIELD OF THE INVENTION

The present invention relates generally to an apparatus and system for adjusting setting of a power system device, and more particularly to an apparatus and system for adjusting settings of a power system device using a magnetically coupled actuator.

BACKGROUND OF THE INVENTION

Power transmission and distribution systems may include power system protective, monitoring, and control devices such as protective relays, faulted circuit indicators (FCIs), and the like. Throughout, the term "power system device" will include any power system protective, monitoring, or control device. Power system device may also be used herein to describe any device associated with devices which protect, monitor or control power systems. For example, FCIs and radio interface units associated therewith may be considered a power system device.

FCIs play a vital role in detecting and indicating faults and locations of faulted conductors to decrease the duration of power outages and improve the reliability of power systems throughout the world. Electrical utilities depend on FCIs to help their employees quickly locate faulted conductors. Most conventional FCIs utilize a mechanical target or a light emitting diode (LED) to provide a visual indication of a faulted conductor. By visually scanning FCIs located at a site, an electrical utility crew can quickly locate a fault. Industry statistics indicate that FCIs reduce fault location time by 50%-60% versus the use of manual techniques, such as the "refuse and sectionalize" method. Nonetheless, electrical utilities still spend substantial amounts of time and money determining the locations of faults on their networks.

Electrical utilities rely on a number of additional techniques to further decrease time spent locating faults. For instance, modern FCIs frequently have one or more contact outputs that activate on the detection of a fault. These contact outputs can be connected to a Supervisory Control and Data Acquisition ("SCADA") system, allowing remote monitoring of a given FCI's status. This technique works well for above-ground sites, where a cable from the FCI to a monitoring device can be installed, and the monitoring device can be connected to a remote site by a communications line. However, this technique is expensive for underground sites, where an underground communications line must be installed.

Another recent advancement is the use of radio frequency ("RF") technology within faulted circuit indication systems. In one prior art system, each FCI communicates with a radio interface unit which communicates the occurrence of a fault to an external receiver. The radio interface unit is often located in proximity to an FCI within an underground vault, which is susceptible to external elements. For example, vaults may often be filled with water thereby exposing the radio interface unit located therein to also be exposed to such. In another example, for overhead FCI systems, radio interface units are also exposed to the external elements as they are situated in proximity to the overhead FCI device.

More specifically, in one prior art system, each FCI contains a two-way radio that communicates the occurrence of a fault to an intelligent module installed within about 100 feet from the FCI. The intelligent module then uses the existing telephone network to communicate a fault occurrence to a remote site, triggering the dispatch of a team to the fault site. However, this system is vulnerable to phone network outages. In addition, a crew dispatched to the fault site must then monitor a readout located on the intelligent module to ensure that the fault has been properly cleared. As the intelligent modules are frequently located on power line poles, viewing an intelligent module's readout may be inconvenient.

An improvement on this system is the use of a wireless device to monitor radio signals from RF equipped FCIs which are connected to a radio interface unit. Using a wireless device, a utility crew can locate a fault and determine when the fault has been properly cleared by monitoring the display of the wireless device. However, conventional wireless devices provide no indication as to whether a particular FCI is actually connected to the radio interface unit. In addition, prior art devices do not display the status of a plurality of or multiple groups of FCIs simultaneously.

Both overhead and underground FCIs are often located in close proximity to one another. As such, signals from FCIs or other external sources interfere with one another, making it nearly impossible to determine which device's information is being displayed. Accordingly, it is an aspect of the present invention to provide for a system for identifying each FCI and/or the radio interface unit corresponding thereto. In one present invention embodiment, an address is assigned to each FCI and/or radio interface unit corresponding thereto.

Radio interface units are often located in proximity to an FCI within an underground vault, which is susceptible to external elements. For example, vaults may often be filled with water thereby exposing the radio interface unit located therein to such. In another example, for overhead FCI systems, radio interface units are also exposed to the external elements as they are situated in proximity to the overhead FCI device. As such, it is an object of the present invention to provide for a system and method for adjusting settings to a substantially self-contained device.

Moreover, prior art apparatus and methods for adjusting settings of power system devices often necessitate an electrical or mechanical connection to the electronic components contained within the housing. As such, these apparatuses require outlets for such connections (e.g., a switch engaging an internal electronic component which protrudes from the housing or a wired connection extending from an internal electronic component to an external device). During persistent harsh conditions, such as submersion in water, water may seep through these outlets and thereby damage the electronic components housed therein. Alternatively, these metal contacts from these connections may cause electrical sparks which are dangerous in various conditions, (e.g., environments where the connectors are exposed to flammable liquids or gases). Accordingly, it is another object of the present invention to provide an apparatus and method for adjusting settings of a power system device without requiring a mechanical or electrical connection to its internal electronic components.

This and other desired benefits of the preferred embodiments, including combinations of features thereof, of the invention will become apparent from the following description. It will be understood, however, that a process or arrangement could still appropriate the claimed invention without accomplishing each and every one of these desired benefits, including those gleaned from the following description. The appended claims, not these desired benefits, define the subject matter of the invention. Any and all benefits are derived from the multiple embodiments of the invention, not necessarily the invention in general.

SUMMARY OF THE INVENTION

The disclosed invention achieves its objectives through an apparatus for adjusting settings of a power system device. The apparatus generally includes an actuator including at least one magnet which corresponds to a particular setting value of the power system device. The apparatus also includes a magnetic field sensor adapted to detect a magnetic field, whereupon a detection of a magnetic field causes the magnetic field sensor to cause a transmission of a signal representative of the particular setting to the power system device.

In yet another embodiment, a system for identifying a power system device is provided. The system generally includes an actuator having a select arrangement of magnets. The system further includes at least one magnetic field sensor for sensing the select arrangement of magnets. A microprocessor is coupled to the magnetic field sensor, wherein upon sensing the select arrangement of magnets by the magnetic field sensor, the microprocessor establishes an identification setting for the power system device based upon the select arrangement of magnets.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

BRIEF DESCRIPTION OF THE DRAWINGS

Although the characteristic features of this invention will be particularly pointed out in the claims, the invention itself, and the manner in which it can be made and used, can be better understood by referring to the following description taken in connection with the accompanying drawings forming a part hereof, wherein like reference numerals refer to like parts throughout the several views and in which:

DETAILED DESCRIPTION OF THE VARIOUS EMBODIMENTS OF THE PRESENT INVENTION

Figure 1:
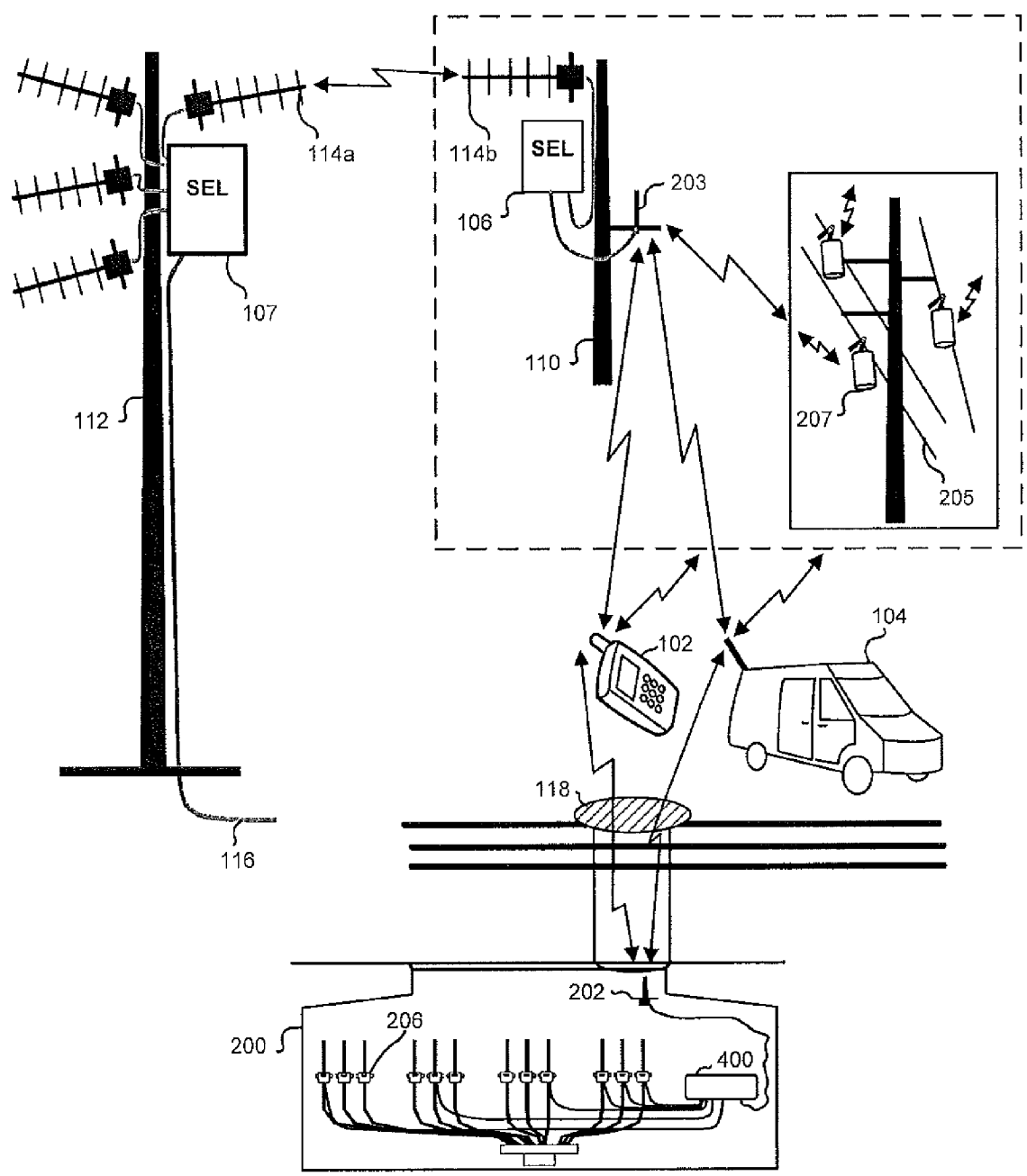
FIG. 1 illustrates a system view of a FCI monitoring system in accordance with an aspect of the present invention.

FIG. 1 illustrates a FCI monitoring system in accordance with an aspect of the present invention. A number of overhead FCIs 207 each contain a two-way radio that communicates the occurrence of a fault via a short range antenna 203 to a local site 110 having an intelligent module 106 installed within radio range of the FCIs 207. The intelligent module 106 then uses the existing wired telephone network (not shown) to communicate the fault occurrence to a remote site 112. Alternatively, the intelligent module may include a radio interface unit associated therewith for communication with an antenna 114b to communicate the fault occurrence to a remote site 112 having another long range RF antenna 114a. The remote site 112 includes a remote intelligent module 107, which may be connected to another site (not shown) via a wired connection 116. When a fault is detected by a FCI, the occurrence is relayed in the manner described above to the remote site 112, triggering the dispatch of a team to the fault site. The user then uses a wireless device 102 (e.g., a wireless handheld device). In another embodiment, the wireless device may be installed in a vehicle 104 to determine which conductor 205 is faulted.

Note that the conductors could also be located in an underground vault 200, which may be accessible through an access port such as, for example, a manhole 118. FCIs 206 attached to the underground conductors are wired to a radio interface unit 400 with a short range antenna 202 to communicate with the wireless device 102 or wireless device installed in a vehicle 104. In one embodiment, the short range antenna 202 may part of or be separate from the radio interface unit.

Figure 2:
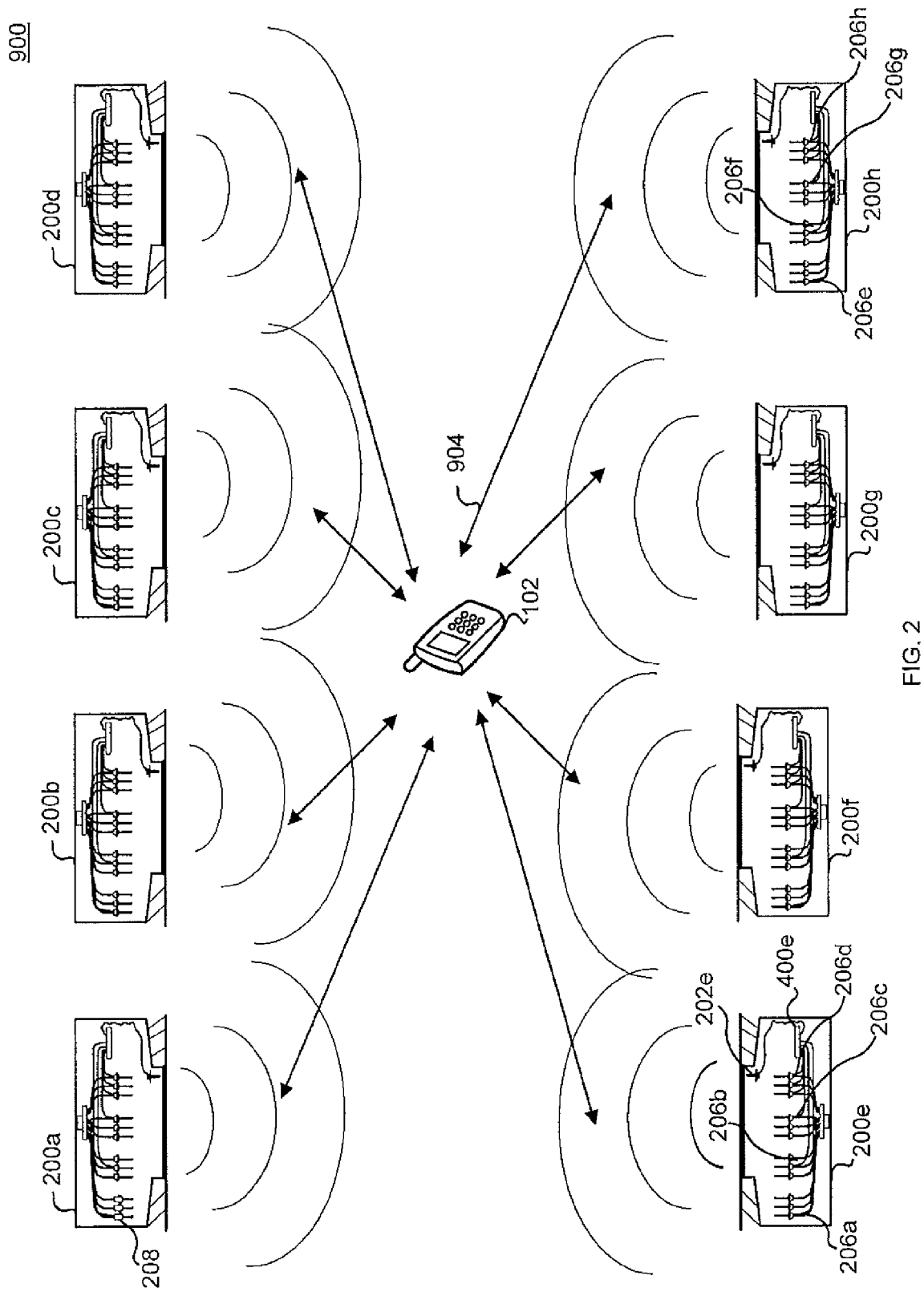
FIG. 2 illustrates a wireless device communicating with eight radio interface units, each of which is connected to four groups of FCIs in accordance with an aspect of the present invention.

Referring to the drawings and to FIG. 2 in particular, a wireless device 102 communicates with eight installations of FCIs 200a-200h. As illustrated, each installation of FCIs consists of a radio interface unit, and four separate groups ("ways") of FCIs, wherein each group has three FCIs, one for each phase. For example, the installation shown at 200e, as shown in FIG. 2 includes four separate groups 206a-d of FCIs connected to a radio interface unit 400e with a separate short range antenna 202e.

The radio interface unit 400e may include a particular identification setting such that it may be differentiated from the other radio interface units. For example, this identification setting may be in the form of a designation setting (e.g., serial number), whereupon each particular radio interface unit has a particular designation (e.g., a particular serial number). In another embodiment, the identification setting may be in the form of an address setting (e.g., a media access control (MAC) address). In yet another embodiment, in order to ensure proper differentiation among a plurality of units, each radio interface unit may include both a designation setting and an address setting. For example, both radio interface unit 400b and radio interface unit 400e may be associated with particular address (e.g., address 5). In order to differentiate between these radio interface units 400b and 400e, each radio interface unit 400b and 400e is given a particular designation setting (e.g., particular serial numbers). In this way, radio interface units may be differentiated.

Each FCI within these separate groups 206a-d may be used to monitor the various phases (e.g., commonly referred to as the A, B, C phases) associated therewith. For example, each of the FCIs associated with way 206a may be used to monitor the three phases associated therewith. Through this system, the installation 200e of FCIs 206a, 206b, 206c, 206d may communicate with wireless device 102.

Additionally, the wireless device 102 may alternatively be adapted to communicate with radio interface units associated with overhead fault circuit indicators as illustrated in FIG. 1. In yet another embodiment, the wireless device may be in the form of a personal digital assistant (PDA), a laptop computer or a handheld computer with a wireless interface, etc.

Figure 3:
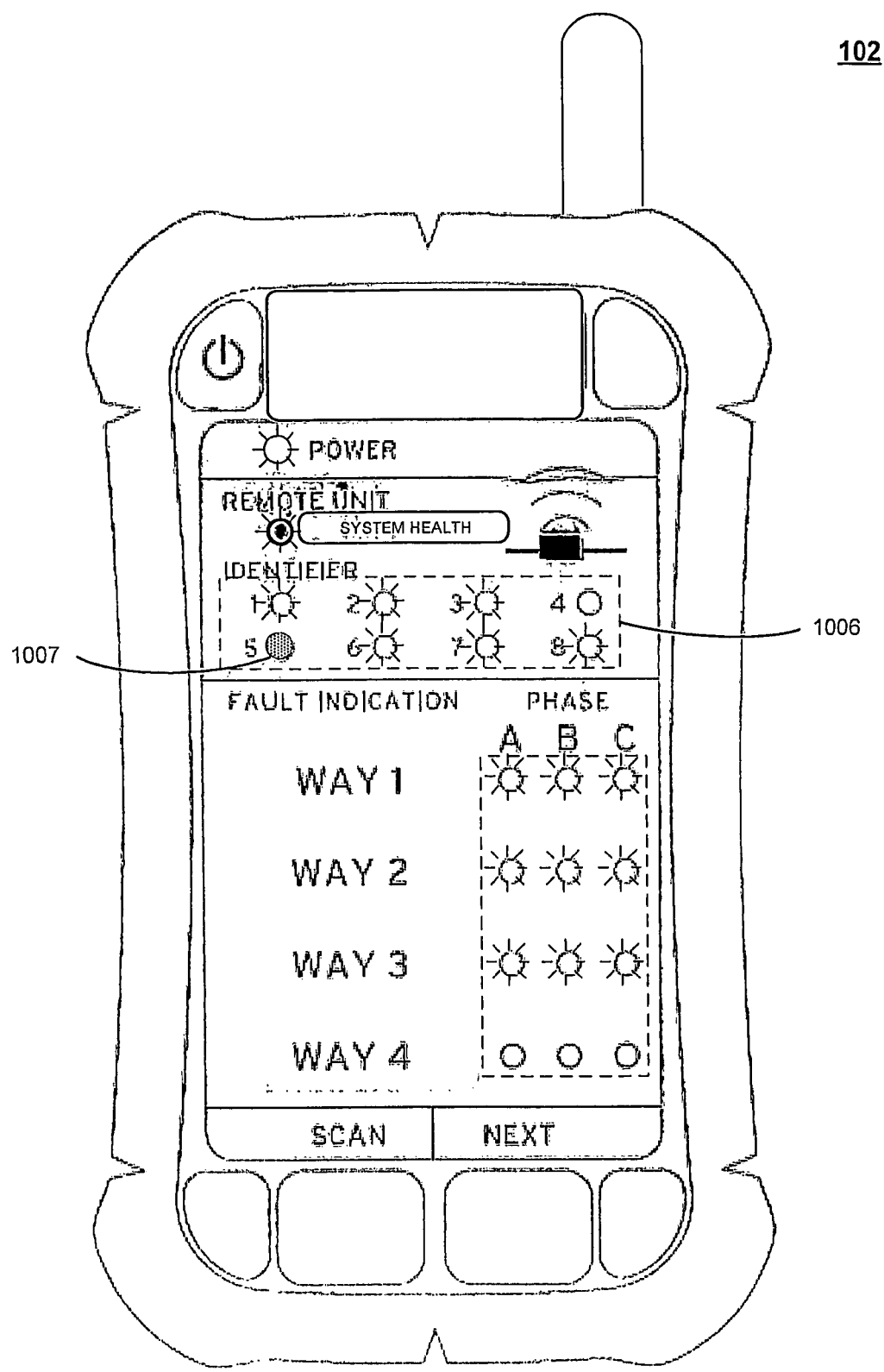
FIG. 3 illustrates the user interface of a wireless device of FIG. 2 used to monitor a number of groups of FCIs connected to separate radio interface units for their status.

In one embodiment as illustrated in FIG. 3, the identification setting (e.g., an address setting) each radio interface unit may be displayed on the wireless device 102. For example, the wireless device 102 is shown to display address 5 as illustrated by amber-colored LED displayed at 1007 of the identifier portion 1006. As discussed, with respect to FIG. 2, address 5 may be associated with radio interface unit 400e.

Figure 4A:
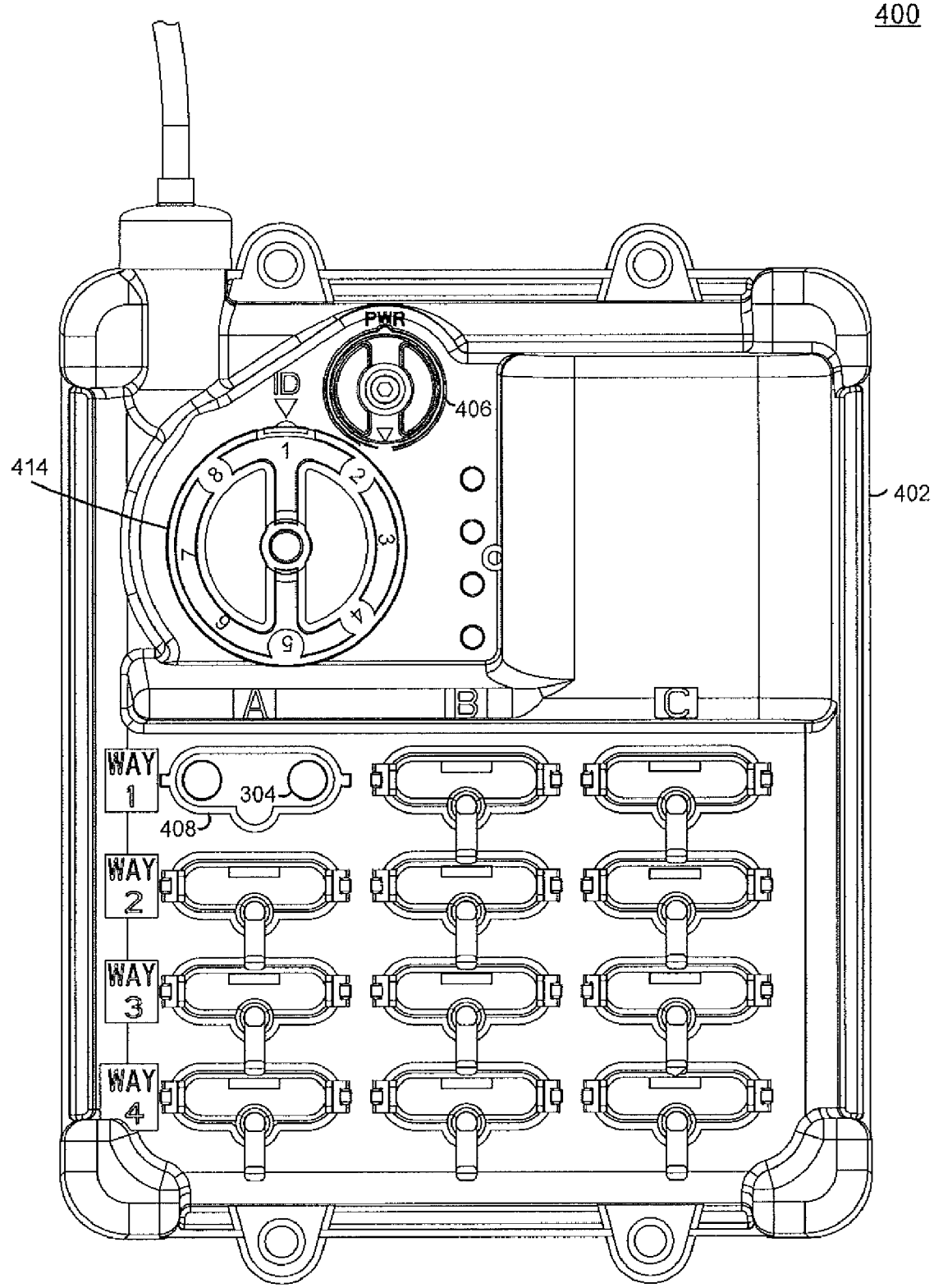
FIGS. 4A and 4B illustrate a radio interface unit of FIG. 2.
Figure 4B:
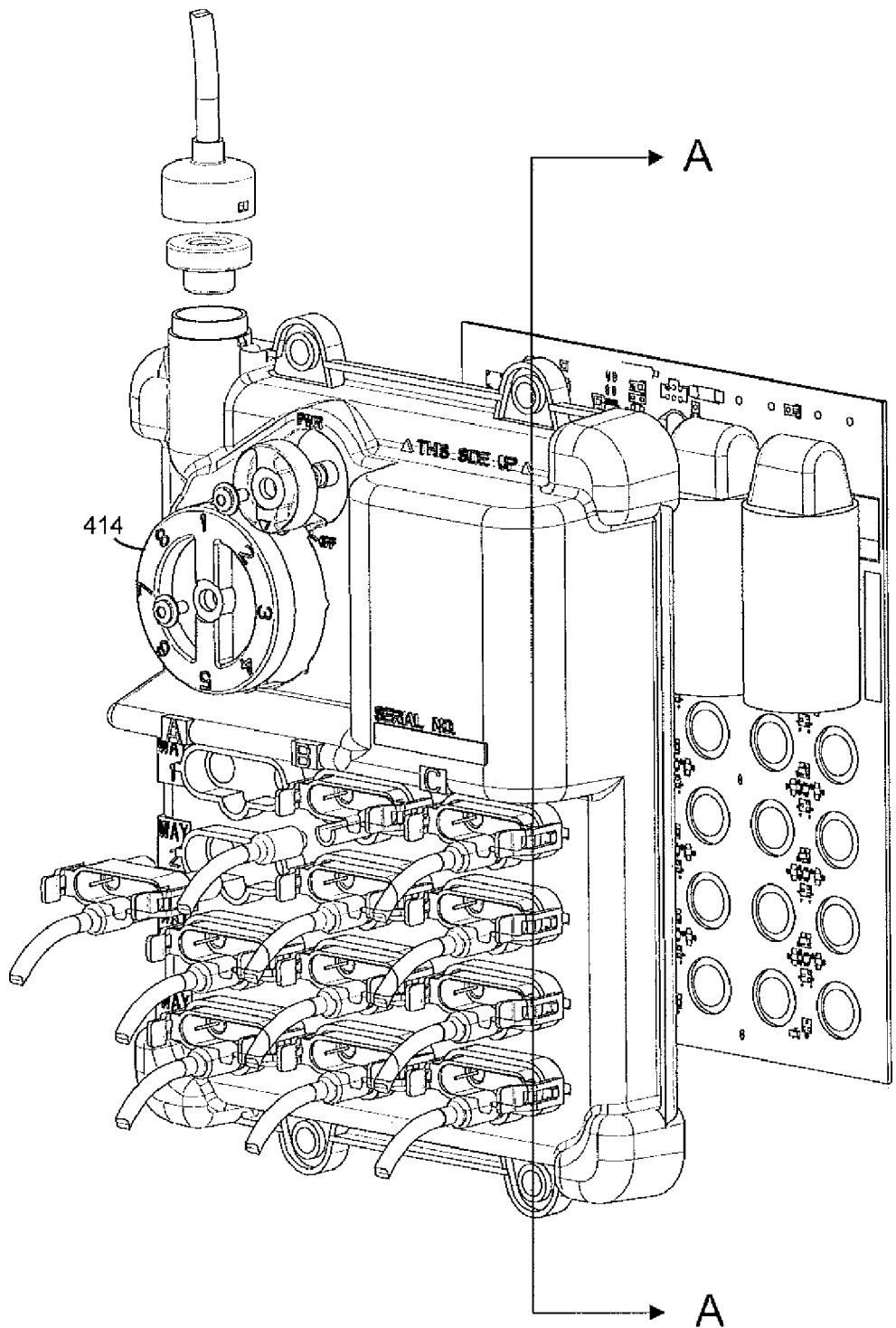

As illustrated in FIGS. 4A and 4B, the address setting of a radio interface unit 400 may be adjusted by simply turning the address dial 414. Although this embodiment specifically describes the setting in the form of an identification setting and, more particularly an address setting, the setting to be adjusted may be any setting, (e.g., a designation setting, power setting, communication setting, etc.). Moreover, although a dial is specifically shown, any actuator is suitable (e.g., a linear multi-position switch instead of a dial).

The address dial 414 may also be self-contained. Accordingly, the address dial does not mechanically or electrically engage any of the internal electronic components contained within the housing 402 of the radio interface unit. This allows for the housing 402 of the radio interface unit to be substantially self-contained. As such, the substantially self-contained housing 402 allows the radio interface unit 400 to be submergible and capable of withstanding harsh environments. This arrangement is an example of a system for adjusting the settings of a power system device using a magnetically coupled actuator.

Figure 5:
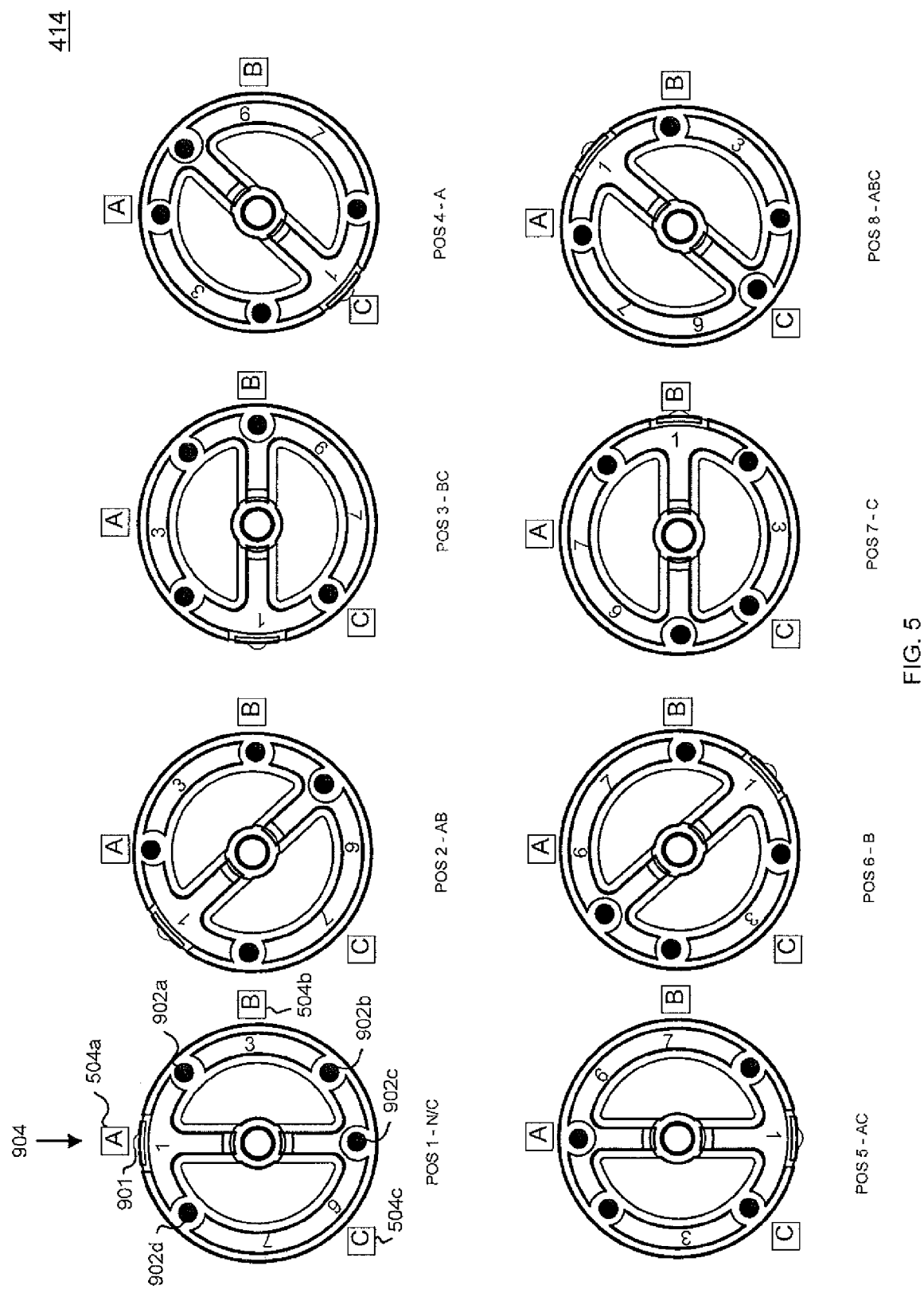
FIG. 5 illustrates a dial having a plurality of magnets in a select arrangement, wherein each arrangement corresponds to a select identification setting.

More specifically, FIG. 5 illustrates the address dial of FIG. 4. The address dial generally includes a plurality of magnets situated in a select arrangement. By turning the address dial 414, the plurality of magnets may be situated in various select arrangements. The select arrangements may correspond to various select addresses. In the illustrated embodiment, turning the address dial 414 in the counter-clockwise direction progresses through the various addresses in increasing order. Alternatively, the radio interface unit may be configured such that turning the address dial 414 in the clockwise direction progresses through the various addresses in increasing order.

In an embodiment, the magnetically coupled address dial 414 has a start position at 901 and a circular rotatable dial with a plurality of embedded magnets (e.g, 902a to 902d). The arrangement of magnets may correspond to select addresses. More specifically, when the magnets are coupled to one or more magnetic field sensors such as Hall effect sensors or Reed switches 504a, 504b and 504c at positions A, B and C, the select arrangement of the magnets is detected and a select address corresponding thereto is provided.

In an embodiment of the present invention, address dial 414 includes four magnets 902a to 902d, which may be coupled to three magnetic field sensors for detecting the select arrangement of the magnets. The Hall effect sensors or Reed switches 504a to 504c are connected to a microprocessor 310 (FIGS. 6A, 6B, 6C, and 6D) within radio interface unit 400. The microprocessor processes the select magnet arrangement and provides a select address corresponding thereto.

The illustrated embodiment has eight settable positions indicated at position A as a position pointer 904. The three bits read by Hall effect sensors or Reed switches 504a, 504b and 504c represent binary addresses corresponding to select radio interface units. For example, magnets such as 902a and 902b coupled to Hall effect sensors or Reed switches A and B will form a binary bit of 011. This binary bit provides for a specific binary address for the radio interface unit. A binary address table corresponds to the pointer position 904 can be constructed as below:

| Pointer Position | Hall Sensor coupled | Binary Address |
| --- | --- | --- |
| 1 | N/C | 000 |
| 2 | AB | 011 |
| 3 | BC | 110 |
| 4 | A | 001 |
| 5 | AC | 101 |
| 6 | B | 010 |
| 7 | C | 100 |
| 8 | ABC | 111 |

Fewer or more addresses can be accomplished by using fewer or more permanent magnets and/or fewer or more Hall effect sensors or Reed switches in similar arrangement. In an embodiment, the magnetically coupled address dial 414 magnet and magnetic field sensor position pattern can be also mirrored or permutated for the same number of addresses.

As shown in FIG. 4A, the radio interface unit 400 may also include a power dial 406 for effecting the power of the unit. The power dial 406 may include a magnet, which may be adjustable such that power is supplied to the radio interface unit when the magnet is coupled to a switch contained in the housing of the radio interface unit. The power dial 406 may further be coupled to the address setting dial 414 such that every time the address setting dial 414 position is changed the power dial 406 will turn to the reset position to power off the radio interface unit 400. In this manner, the previous address setting will not be stored.

In another embodiment, by turning the power dial 406 to "ON" position, the radio interface unit 400 may be adapted to execute the following sequence:

1) Measure the battery voltage. If the voltage is below a minimum voltage, then turn off the radio interface unit 400, otherwise save the measured voltage.

2) Perform a complete RAM and Flash diagnostic test and record the results in RAM.

3) Read configuration parameters and enter normal operation.

In an embodiment, the address dial 414 includes a magnetically coupled address interface that is water tight sealed using potting material. The magnetically coupled address interface is operable in an environment exposed to water such as an outdoor, overhead or underground installations.

Figure 6A:
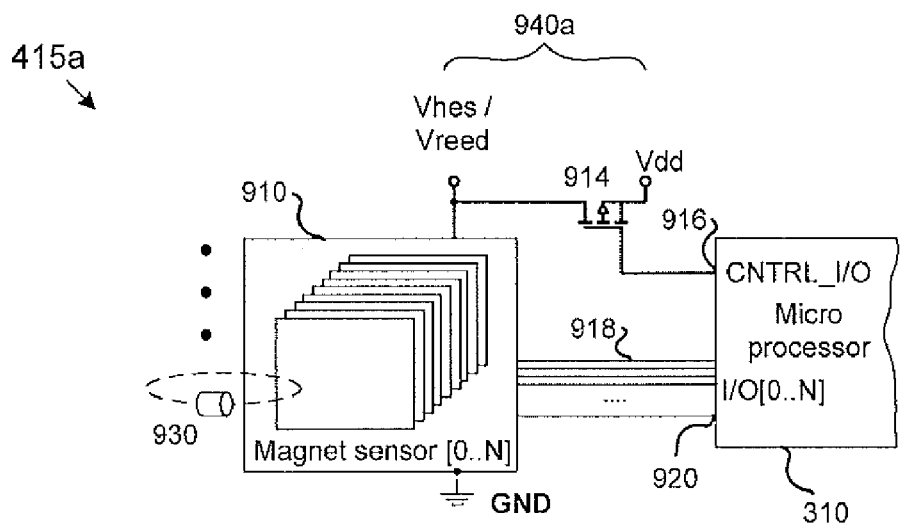
FIGS. 6A-6D are circuit diagrams illustrating various embodiments of systems illustrate systems for identifying a power system device according to various aspects of the present invention.

FIG. 6A depicts a circuit diagram of an embodiment of a magnetically coupled address interface. As illustrated in FIG. 6A, the address dial 414 includes a magnetically coupled address interface 415a or 415b including an arrangement of a plurality of magnets 930. When the magnets 930 are coupled to the magnetic field sensors 910, a select address 918 may be provided. The various addresses 918 are dependent upon the various arrangements of the magnets. A microprocessor (or other logic device such as an FPGA, ASIC, or discrete logic) 310 may further be provided for processing the select arrangement of magnets and providing addresses 918 corresponding thereto. The microprocessor 310 may further be adapted to provide a power management output control 916 to activate or deactivate the biasing circuits 940a or 940b of the magnetic field sensor 910. In an embodiment, the magnetic field sensors 910 are a plurality of hall-effect sensors or a plurality of Reed switches.

In another embodiment, a battery-saving environment for the radio interface unit is further provided whereupon the magnetic field sensors 910 are turned on momentarily and turned off after the addresses are read. For example, the radio interface unit may be adapted to turn on upon activation by a power management control 916 (e.g., the power dial of FIG. 5) or upon receiving an external request command from an external device via the microprocessor 310.

In an embodiment, the biasing circuit 940a includes a power source Vdd, a plurality of pull up resistors (not shown in FIG. 8B) and at least a transistor such as a P-channel MOSFET 914 that supplies the biasing voltage Vhes/Vreed to the magnetic field sensor 910. In an embodiment, a power management control I/O 916 in the microprocessor 310 activates or deactivates the biasing circuit 940a by controlling the gate voltage of the P-channel MOSFET 914. Upon an initial power on or a power-on-reset, the control I/O 916 activates the biasing circuit 940a to bias the magnetic field sensor 910 for a brief period such as approximately 100 microseconds to about 150 microseconds. The biasing voltage Vhes/Vreed is turned off after the addresses 918 are read by the microprocessor 310. In an embodiment, subsequent to reading the addresses 918, the control I/O 916 deactivates the biasing circuit 940a indefinitely until the power management issues a control I/O 916 to reactivate the biasing circuit 940a.

The activation or deactivation of the magnetic field sensor 910 may be controlled by a factory set power management program in the microprocessor 310 or upon receiving an external request command from an external device. The external devices may include a hand held terminal, PDA, cellular phone or laptop host computer, alternatively mounted in a vehicle. When the biasing circuit 940a is deactivated, the magnetic field sensor 910 consumes essentially no current, thus extending the battery life.

Figure 6B:
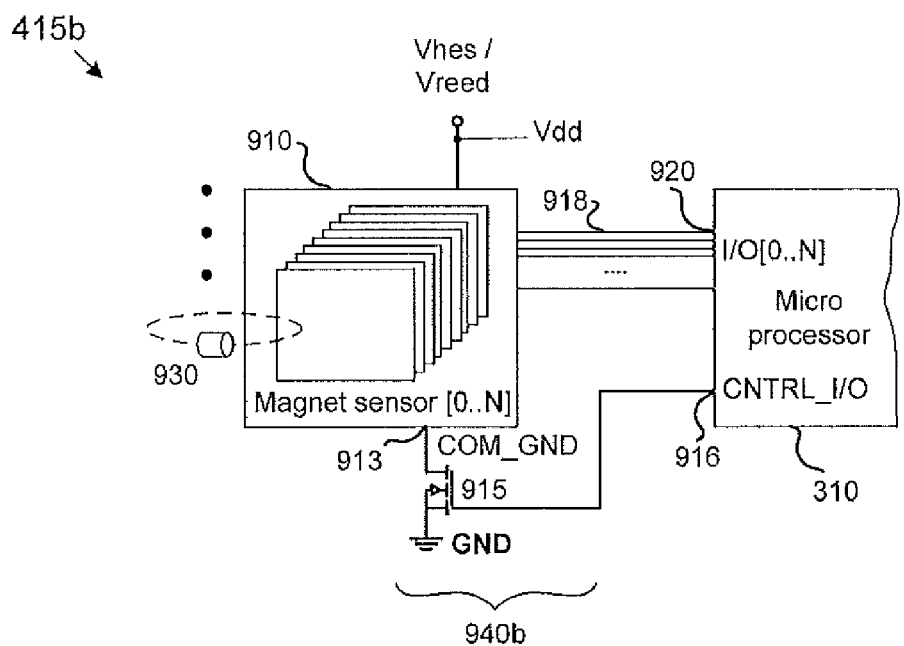

FIG. 6B depicts another embodiment of a magnetically coupled address interface 415b. As shown in FIG. 6B, a biasing circuit 940b includes connecting the ground to an N-channel MOSFET 915 while the biasing voltage Vhes/Vreed is connected to Vdd. The biasing circuit is activated or deactivated through controlling the gate of the N-channel MOSFET 915. In either embodiments, the transistors used in biasing circuits 940a or 940b can be bipolar transistors or any suitable switching transistors to perform the activation or deactivation switching function.

Figure 6C:
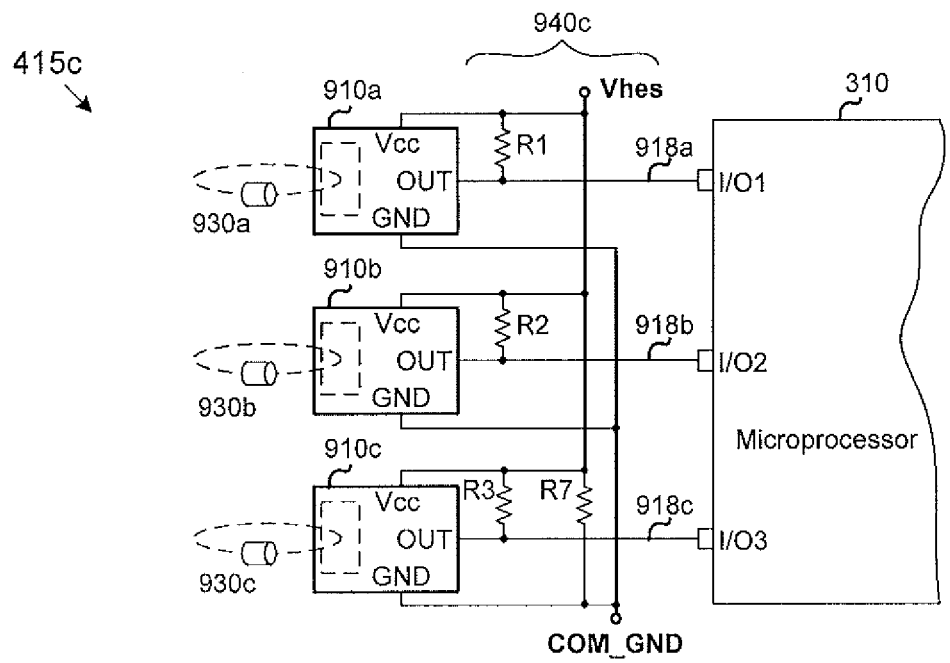

FIG. 6C depicts an embodiment of a magnetically coupled address interface 415c between a plurality of hall-effect sensors to a microprocessor. In an embodiment, three hall-effect sensors 910a to 910c are used as magnetic field sensors to sense respective magnets 930a to 930c. The Hall effect sensors 910a to 910c outputs are open drain and respective pull-up resistors R1 to R3 with values ranging from about 10 kOhm to about 100 kOhm connected to the biasing voltage Vhes are used to indicate logic levels 1 in respective addresses 918a to 918c to I/O1 to I/O3 of microprocessor 310. In the presence of magnets 930a to 930c, the Hall sensors 910a to 910c will give a logic level 0 to the respective addresses 918a to 918c.

In an embodiment illustrated, the biasing circuit 940c uses a transistor such as a P-channel MOSFET 914, a PNP bipolar transistor or any suitable switching transistor (not shown) to activate or deactivate the biasing circuit 940c. In an alternate embodiment, the biasing circuit 940c uses a transistor such as a N-channel MOSFET 915, a NPN bipolar transistor or any suitable switching transistor (not shown) connected to the ground COM_GND to activate or deactivate the biasing circuit 940c, with the biasing voltage Vhes connected to Vdd in this scheme. An optional discharging resistor R7, with values of hundreds of kOhms connected to the ground COM_GND can be used for discharging any remaining voltages, with Hall effect sensors 910a to 910c are powered down to prevent floating address lines 918a to 918c to I/O1 to I/O3 in microprocessor 310.

Figure 6D:
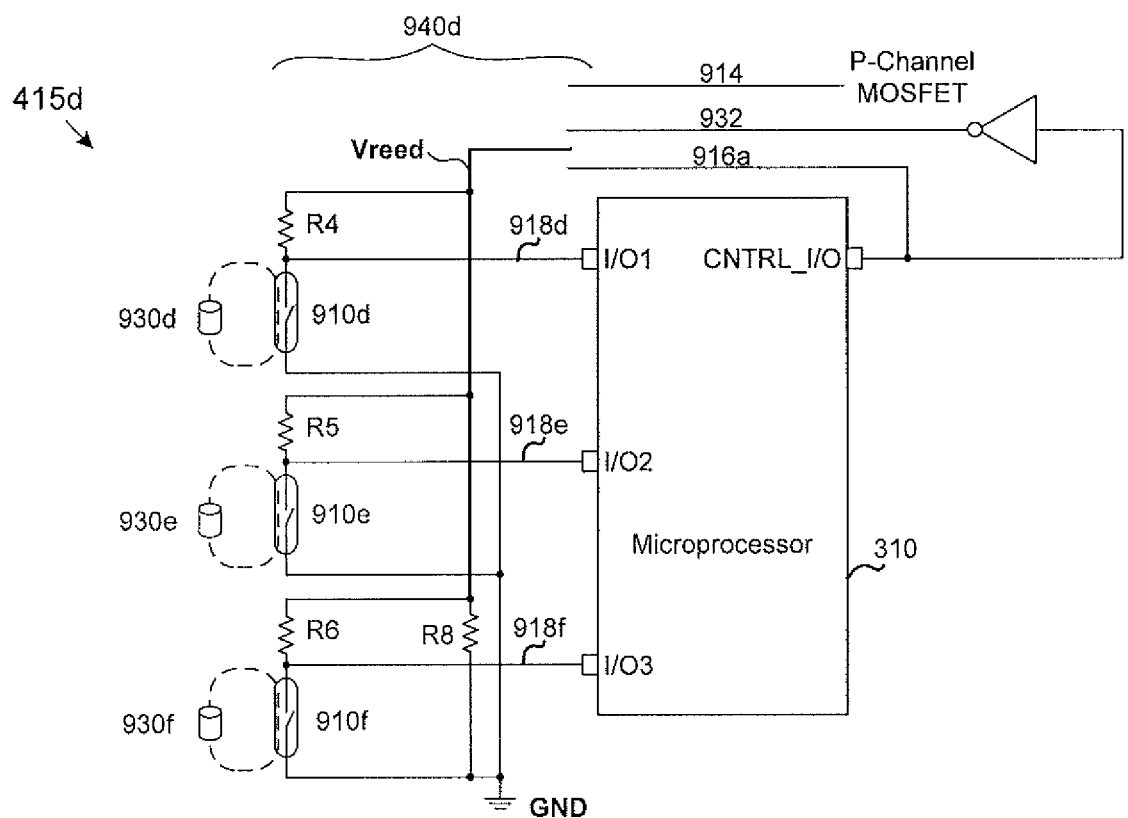

FIG. 6D depicts another embodiment of a magnetically coupled address interface 415d between a plurality of Reed switches to a microprocessor. In an embodiment, three Reed switches 910d to 910f are used as magnetic field sensor to sense respective magnets 930d to 930f. The Reed switches 910d to 910f are connected to respective pull-up resistors R4 to R6. In the absence of magnet, the pull-up resistors indicate logic 1 to address lines 918d to 918f. In the presence of magnets 930d to 930f, the Reed switches 910d to 910f close where the currents are shunt to ground, thus indicating logic 0 in addresses 918d to 918f to I/O1 to I/O3 of microprocessor 310.

In an embodiment of battery saving circuit design, the biasing voltage Vreed can be powered with On/Off control from a microprocessor I/O 916, with a higher current buffer 932 or with a P-channel MOSFET 914, a PNP bipolar transistor or any suitable switching transistor (not shown). The choice may be factory set by design. The pull-up resistors R4 to R6 can be in a range from about 10 kOhm to about 100 kOhm, allowing a relatively weak voltage source to drive three or more resistors and Reed switches. In the previous embodiment shown in FIG. 6C, the Hall-effect sensors 910a to 910c cannot be driven from a microprocessor 310 nor from a current buffer 932 as shown in FIG. 6D since relatively high currents are needed to be driven with a P-channel, or N-channel MOSFETs or any suitable switching transistor with a proper circuit connection. In an alternate embodiment, the biasing circuit 940d can use a N-channel MOSFET 915, a NPN bipolar transistor or any suitable switching transistor (not shown) connected to the Reed switches ground GND while the biasing voltage Vreed is connected to Vdd. A discharging resistor R8 of values of hundreds of kOhms connected to the ground GND may be used for discharging any remaining voltages when all Reed switches 910d to 910f are open, preventing floating address lines 918d to 918f to I/O1 to I/O3 to microprocessor 310.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated.

The invention claimed is:

1. An apparatus for adjusting settings of a power system device, comprising:

an actuator, said actuator including at least one magnet inducing a magnetic field which corresponds to a particular setting value of the power system device;

a magnetic field sensor positioned in relation to said actuator, said magnetic field sensor adapted to detect the presence or absence of the magnetic field when activated, wherein upon detection, the magnetic field sensor:

causes a transmission of a signal representative of the particular setting to the power system device; and, is deactivated,
wherein the particular setting is a device identification setting for the power system device.

2. The apparatus of claim 1, wherein the device identification setting is either a designation setting or an address setting.

3. The apparatus of claim 1, wherein the power system device is a radio interface unit.

4. The apparatus of claim 1, wherein the power system device is a faulted circuit indicator for indicating a fault in a conductor of an electric power system.

5. The apparatus of claim 1, wherein the actuator and magnetic field sensor are each housed in separate substantially self-contained units.

6. The apparatus of claim 1, wherein either the actuator or the magnetic field sensor are encapsulated in an encapsulate material.

7. The apparatus of claim 1, wherein the actuator and magnetic field sensor are in an environment exposed to a harsh condition.

8. The apparatus of claim 1, wherein the magnetic field sensor is a hall-effect sensor.

9. The apparatus of claim 1, wherein the magnetic field sensor is a reed switch.

10. A system for distinguishing a power system device from another power system device, including
an actuator having a select arrangement of magnets,
at least one magnetic field sensor for sensing the select arrangement of magnets,
a microprocessor coupled to the magnetic field sensor, wherein upon sensing the select arrangement of magnets by the magnetic field sensor, the microprocessor establishes an identification setting based upon the select arrangement and deactivates the magnetic field sensor;
wherein the identification setting is a device identification setting for the power system device.

11. The system of claim 10, wherein the device identification setting is either a designation setting or an address setting.

12. The system of claim 10, wherein the actuator is a dial.

13. The system of claim 10, wherein the microprocessor is further adapted to activate or deactivate a power management circuit based upon sensing of a select arrangement of magnets.

14. The system of claim 10, wherein the power system device is a radio interface unit.

15. The system of claim 10, wherein the power system device is a faulted circuit indicator.

16. The system of claim 10, wherein the power system device is a faulted circuit indicator for indicating a fault in a conductor of an electric power system.

17. The system of claim 10, wherein the magnets are separately housed from the magnetic field sensor in substantially self-contained units.

18. The system of claim 10, wherein either the magnets or the magnetic field sensor are encapsulated in an encapsulate material.

19. The system of claim 10, wherein the magnets and magnetic field sensor are related to a power system device which is situated in an environment exposed to water.

20. The system of claim 10, wherein the magnetic field sensor is a hall-effect sensor.

21. The system of claim 10, wherein the magnetic field sensor is a reed switch.

22. The apparatus of claim 1, wherein the actuator and magnetic field sensor are in an environment exposed to water.

23. The apparatus of claim 1, wherein the magnetic field sensor is activated upon powerup of the apparatus.

24. The apparatus of claim 1, wherein the magnetic field sensor is activated upon receipt of an external request command.

25. The system of claim 10, wherein the microprocessor causes the magnetic field sensor to activate upon powerup of the system.

26. The system of claim 10, wherein the microprocessor causes the magnetic field sensor to activate upon receipt of an external request command.

* * * * *